(12) United States Patent
Pisarsky et al.

(10) Patent No.: US 7,257,839 B2
(45) Date of Patent: *Aug. 14, 2007

(54) CALCULATION OF IDENTIFIER CODES DISTRIBUTED AMONG PAN DEVICES

(75) Inventors: Vladimir R. Pisarsky, Sunnyvale, CA (US); Yevgeniy Eugene Shteyn, Cupertino, CA (US)

(73) Assignee: NXP B.V., Eindhoven (NL)

( * ) Notice: Subject to any disclaimer, the term of this patent is extended or adjusted under 35 U.S.C. 154(b) by 726 days.

This patent is subject to a terminal disclaimer.

(21) Appl. No.: 09/956,523

(22) Filed: Sep. 18, 2001

(65) Prior Publication Data

US 2003/0056119 A1    Mar. 20, 2003

Related U.S. Application Data

(63) Continuation of application No. 09/670,129, filed on Sep. 26, 2000, now Pat. No. 6,985,845.

(51) Int. Cl.
| | |
|---|---|
| *G06F 7/04* | (2006.01) |
| *G06F 7/58* | (2006.01) |
| *G06F 15/16* | (2006.01) |
| *G06F 17/30* | (2006.01) |
| *G06K 9/00* | (2006.01) |
| *G06K 19/00* | (2006.01) |
| *H04L 9/00* | (2006.01) |
| *H04L 1/00* | (2006.01) |

(52) U.S. Cl. ............... 726/21; 713/161; 713/168; 713/169; 713/170; 713/182; 713/183; 713/184; 726/3; 726/4; 726/5; 726/6; 726/12; 726/27; 726/28; 726/29; 380/249; 380/250

(58) Field of Classification Search ............ 713/185, 713/155, 201; 380/277–281, 249
See application file for complete search history.

(56) References Cited

U.S. PATENT DOCUMENTS

| | | | |
|---|---|---|---|
| 5,590,199 A | 12/1996 | Krajewski, Jr. et al. | |
| 5,784,464 A * | 7/1998 | Akiyama et al. ............ | 713/155 |
| 6,273,816 B1 * | 8/2001 | Bansal et al. .................. | 463/17 |

FOREIGN PATENT DOCUMENTS

WO    WO-02/27440 A2    4/2002

OTHER PUBLICATIONS

U.S. Appl. No. 09/852,467 title "Device Identification And Control In Network Environment".
U.S. Appl. No. 09/670,129 Title "Security Monitor Of System Runs Software Simulator In Parallel".
U.S. Appl. No. 09/823,141 Title "Task Management System".

* cited by examiner

*Primary Examiner*—Christopher Revak
*Assistant Examiner*—Longbit Chai

(57) ABSTRACT

An ID is being calculated in a manner distributed among devices of the user's personal area network (PAN). The devices communicate in a wireless manner. A server runs a simulation of the PAN. If the server and the PAN calculate matching results, it is assumed that the user's ID is correct for purposes of conditional access. The distribution of the calculation of the ID among the user's PAN devices and its, for practical purposes, stochastic nature render the system very hard to hack.

18 Claims, 1 Drawing Sheet

$$X_k(t)=F_k(X_1(t-1), X_2(t-1), ...,X_M(t-1),S_k, X_k(t-2), X_k(t-3), X_k(t-4), ...,X_k(t-N))$$

CALCULATION OF IDENTIFIER CODES DISTRIBUTED AMONG PAN DEVICES

RELATED APPLICATIONS

This application is a continuation of and claims the benefit of or priority from U.S. patent application Ser. No. 09/670,129, now U.S. Pat. No. 6,985,845, filed Sep. 26, 2000 for Vladimir Pisarsky for SECURITY MONITOR OF SYSTEM RUNS SOFTWARE SIMULATOR IN PARALLEL, herein incorporated by reference in its entirety.

This application further claims the benefit of U.S. Ser. No. 09/823,141 filed Mar. 30, 2001 for Eugene Shteyn for TASK MANAGEMENT SYSTEM.

FIELD OF THE INVENTION

The invention relates to a method of providing an authentication service, e.g., for secure transactions with a data processing system.

BACKGROUND ART AND SUMMARY OF THE INVENTION

Identifier data, passwords or code words, referred to as ID in the remainder of this text, are being used for security purposes in electronic transactions wherein identification or authentication of the user is required. Examples of such transactions include those based on the use of credit cards. Another example is electronic banking. Yet another example is logging in into a company's data network from a remote location and via the Internet. Yet another usage is badge access to secure sites.

In general, the following scheme is implemented. The user has been assigned an ID. The ID has to be memorized or is encrypted on some token, e.g., a card with a magnetic strip or solid state memory, a CE device such as a cellphone, etc. In order to perform an operation or transaction involving this ID, it is required for the user to transmit the ID to a controlling computer (e.g., a bank computer, the computer of a telecom service provider, a security server, etc.). The computer then compares the transmitted ID with the code stored locally in order to make an authorization decision based on the match or mismatch.

There are some drawbacks involved in this practice. For example, the ID is usually constant (i.e., does not change with time) and can be intercepted during transmission, or the token that contains the ID can be stolen. The first disadvantage can be avoided by the use of onetime encrypt codes: a new value for the ID is calculated each time a new connection with a server is required. However, this solves only part of the security problem as it is still possible to crack the code or get the information from an independent source. After some time period of data collection it may be well possible to reverse engineer the required codes. The one-time encrypt code does not solve the problem of the token being lost or stolen.

The inventors propose to increase security level by means of distributing the calculation of a new value of the ID between the user's personal electronic devices. The server or computer that decides on authorization has a simulation running per individual user of the same personal devices to synchronize the ID's values. In this case, it is not enough to steal just one ID code card or credit card. Without the other devices or the user, the card is useless.

The invention relates to a method of enabling a person to use a unique ID. Multiple devices of a PAN of the user are enabled to calculate the ID in a manner distributed among the devices. The system that has to determine whether or not the user's ID is proper can do that by checking if the ID is in conformity with a simulation of the PAN run on a remote server. Alternatively, the various IDs generated by the PAN on different occasions each are representative of this particular user and correspond to an entry in a look-up table. Preferably, each respective one of the devices comprises a respective FSM. The respective FSM calculates per time step a value of a quantity according to a respective mathematical relationship. The respective mathematical relationship has as arguments, e.g., the value of the quantity calculated at a preceding time step by at least another one of the FSMs; and a respective history of values assumed by the quantity calculated by the respective FSM. The respective mathematical relationship is such that the quantity assumes a practically stochastic behavior.

An embodiment of the invention is, e.g., software for use on a personal device for enabling the device to accommodate an FSM and to communicate with another device for implementing the practically stochastic system.

Another embodiment is, e.g., a personal appliance for use in the PAN. The appliance accommodates an FSM and is able to communicate with another appliance in the PAN for implementing the practically stochastic system.

Yet another embodiment is a service for, e.g., a banking-, credit card-, conditional access- or another security system. The service determines whether a user is authorized to access the system. The service runs a simulation of a PAN of the user. This service could be delegated to a trusted party independent of the system to be secured, or could be an integral part of the system.

In a more specific example, the invention considers a distributed information processing system that comprises a cluster of interacting devices or appliances forming, e.g., a personal area network (PAN). The devices communicate preferably through a short-range, wireless protocol, e.g., Bluetooth. The cluster comprises, for example, a cellphone, a digital watch, a PDA, the key fob of the car keys, an electronic device embedded in an inconspicuous object such as a piece of jewelry or a pin, or even in a piece of clothing using wearable electronics, etc., etc. The set of devices is unique per individual user. The devices have finite state machines (FSM's) onboard. A (remote) control server runs a simulator of the cluster's FSM's. Each respective device's FSM calculates per time step a respective numerical value that depends on the values of the other devices' FSM's in the previous step, perhaps also on the respective device's internal state (e.g., based on the device's memory's and I/O message buffers' content), and on a history of the previous values. This mathematical relationship is chosen such that it causes the collection of FSM's to behave as a dynamic process that is considered, for practical purposes, a non-periodic stochastic process. The simulator does the same on the server. The results of the simulator and the devices' FSM's should be identical. Upon a match, the user is assumed to be authorized. Upon a mismatch, the user is assumed to be not-authorized, and an alert can be generated. The ID's value is, e.g., the current numerical value calculated by a specific one of the FSM's, or a combination of values from different FSMs, or a sequence of values, etc.

The security of the system resides in the facts that in order to be able to hack the system, the hacker needs to have a snapshot of the values of all FSM's at a certain step, to collect the values of the steps taken into account in the history, and to get into the internal states of each device. All these manipulations need to be performed in one time step, which makes it a complex computational task and practically impossible due to the distributed character of the system. Several security layers that can be applied individually or combined in order to increase protection, robustness and security of the system.

Set up of the system may depend on what devices or appliances the user takes with him/her in his/her PAN. An automatic controller could be used to initialize the server and/or the devices accordingly. For example, the control system can be used as disclosed in U.S. Ser. No. 09/823,141 filed Mar. 30, 2001 for Eugene Shteyn for TASK MANAGEMENT SYSTEM, in order to determine what the user takes with him/her.

BRIEF DESCRIPTION OF THE DRAWING

The invention is further explained below, by way of example and with reference to the accompanying drawing, wherein.

DETAILED EMBODIMENTS

Figures 1, 2:
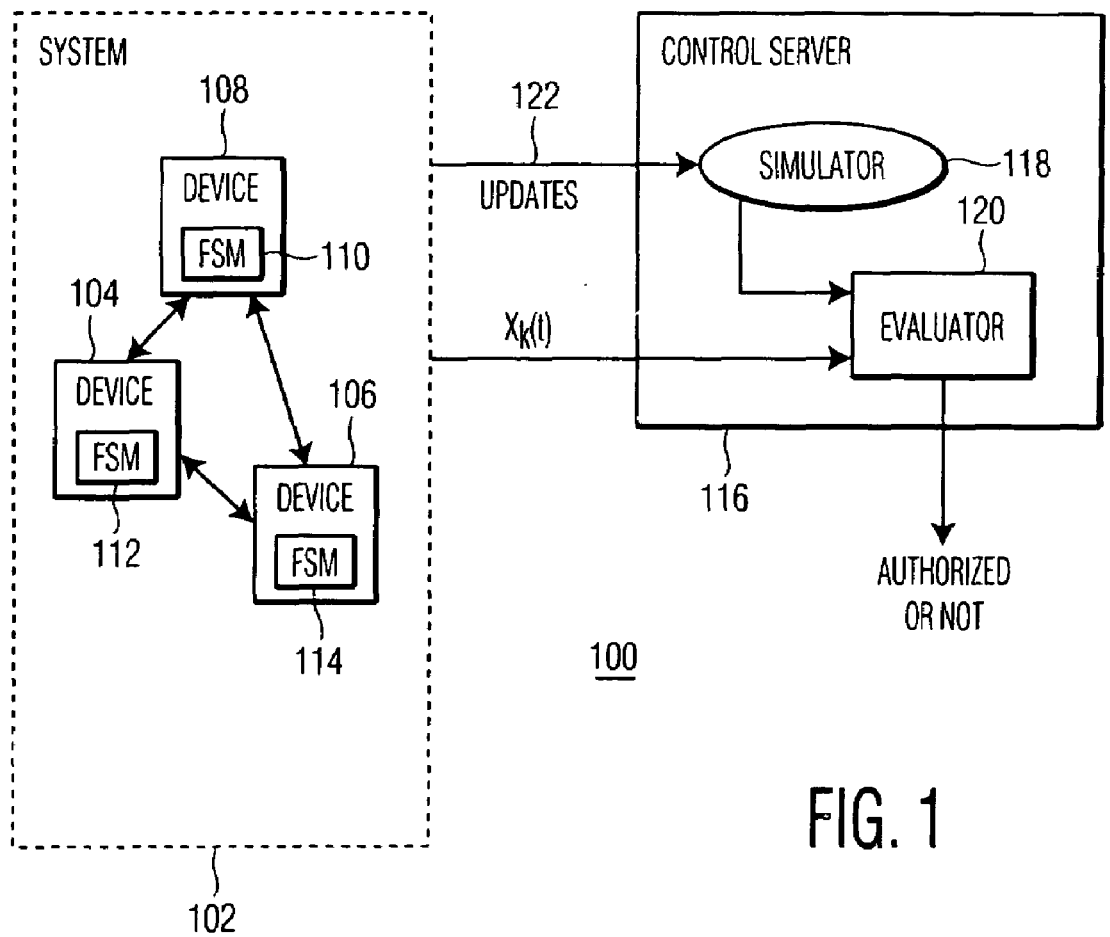
FIG. 1 is a diagram of a system in the invention.
FIG. 2 is a mathematical expression representing an FSM.

In the detailed discussion below the following definitions are being used:

SYSTEM: the conglomeration of the devices under consideration in the PAN;
DEVICE: a component of the SYSTEM that includes a CPU-based controller;
DEVICE STATE INFORMATION (DSI): control code calculated by some rules in the DEVICE's memory, possibly including the DEVICE's I/O message buffers;
CONTROL SERVER: computer outside the SYSTEM that is monitoring operations of the SYSTEM;
SIMULATOR: simulation software simulating the SYSTEM as a distributed network of FSM's.

FIG. 1 is a block diagram of a system 100 in the invention. System 100 comprises a SYSTEM 102, e.g., a PAN. SYSTEM 102 includes DEVICES 104, 106, ..., 108. Each of DEVICES 104-108 has a respective FSM 110, 112, ..., 114. System 100 further comprises a CONTROL SERVER 116 that runs a SIMULATOR 118 simulating the behavior of SYSTEM 102 in software. The results of SIMULATOR 118 are compared with the states of DEVICES 104-108 in an evaluator 120 to determine whether or not the user is authorized.

In a first one of the security layers SIMULATOR 118 is run on CONTROL SERVER 116. For each discrete time step the CPU of each of DEVICES 104-108 calculates a respective DSI associated with the relevant DEVICE. This DSI is compared with a corresponding DSI code that is calculated for that DEVICE by SIMULATOR 118. A mismatch between these values is an indication of, e.g., operational failure or of illegitimate reprogramming of SYSTEM 102.

FIG. 2 is a mathematical expression defining an FSM. A value $X_k(t)$ is calculated for each DEVICE (k) for each time step "t" according to this expression, wherein:

"t" is the current moment in time;
"k" is the index or label for DEVICE (k), running from 1 to M, assuming the number of DEVICES equals M (M equals 3 in the illustrated example) in the PAN;
"$S_k$" is the DSI of DEVICE (k); and
"$F_k$ (., ., .)" is the "k"-th component of a mathematical vector function chosen such that the set of M equations describes a stochastic non-periodical dynamic process.

Accordingly, $X_k(t)$ for a fixed "k" depends on the values X of all DEVICES 104-108 taken at the previous time step, on the DSI of DEVICE (k), and on the history of the value X for DEVICE (k). The length of the history taken into account is determined by the number N. SIMULATOR 118 calculates these values $X_k(t)$ for all "k" in each time step using the same mathematical correspondence. When the user seeks access to a system (not shown) that requires a valid ID, one or more of the values $X_k(t)$ as calculated by DEVICES 104-108 for the point in time "t" are compared with the relevant ones of the values $X_k(t)$ as calculated by SIMULATOR 118 for the same point in time. A discrepancy is an indication that the user is not authorized or that the integrity of SYSTEM 102 has been violated.

At least one device on the PAN is enabled to communicate with CONTROL SERVER 116 directly or through a proxy (not shown). Preferably, the value $X_k(t)$ is send to the SERVER 116 along with the indication of the label k of the designated device, unless the label is pre-defined in the system. In order to increase the accuracy and security of the system, a sequence of generated values $X_p(t=T_q)$ with one or more device labels "p" and optionally with one or more time stamps $T_q$ are communicated to CONTROL SERVER 116. CONTROL SERVER 116 may pick any of the values $X_p(t=T_q)$ in order to evaluate them against the results provided by SIMULATOR 118. Communications between the PAN and other networks can be encrypted using the value $X_p(t=T_q)$ as a seed for the encryption key generator.

In order to reprogram any of DEVICES 104-108 or in order to issue some extra command directly and with effect on SYSTEM 102, a virus or a hacker has to penetrate all DEVICES 104-108 of SYSTEM 102 and has to collect the required history $X_k(t-1)$, $X_k(t-2)$, ..., $X_k(t-N)$ for all DEVICES 104-108. Due to the stochastic nature of the evolution of the model given by the set of equations of FIG. 2, all these manipulations are to be performed during one time step. This makes undetected hacking of interfering with SYSTEM 102 technically and computationally a very complex task The set of FSMs forms a discrete system that can assume a finite number of possible system states. The states assumed in succession by the system can in principle be calculated via the deterministic equations of FIG. 2. The sequence of states is therefore not truly stochastic, unless a stochastic variable is introduced into the mathematical relationship. For example, one or more of devices 104-108 may provide a stochastic value for a parameter taken into account in the development of the system by making one or more of the $F_k$ depend on it. If device 104 comprises a cellphone, the value for the parameter is, e.g., the number of calls made or received over the last week, possibly weighted by the time intervals between the calls, and determined at the time the user needs an ID. If device 106 is a radio or an MP3 player, the value for the parameter is, e.g., a number determined by the content of a buffer for data played out. The expressions "stochastic" and "non-periodic stochastic" are therefore to be understood as also indicative of non-stochastic behavior that looks stochastic for practical purposes of this invention, e.g., for the lifetime of the application.

Herein incorporated by reference:
U.S. Ser. No. 09/852,467 filed May 9, 2001 for Eugene Shteyn for DEVICE IDENTIFICATION AND CONTROL IN NETWORK ENVIRONMENT. This document relates to a control network for home appliances comprising a module for interfacing an appliance to the network. The module adopts the identity of the appliance when the module and the appliance are being interconnected. The appliance comprises a tag, e.g., in its power plug, with identifying information that gets read by the module and transferred to a controller. The module itself can have a location dependent identifier to enable topology dependent software applications.

U.S. Ser. No. 09/823,141 filed Mar. 30, 2001 for Eugene Shteyn for TASK MANAGEMENT SYSTEM. This document relates to a system for managing tasks involving the movement of an object. The system includes an indicator attached to the object, and a sensor for detecting the position or movement of the object, for use with a monitoring component, e.g., for generating and canceling in a user-interface reminders to perform the task based upon input from the sensor. In one embodiment, the indicator is, e.g., a radio frequency, passive device connected to the object, the sensor is a conventional proximity sensor positioned within the path of travel the object will follow when the task is performed, and the monitoring component is part of a home network linked to a PDA (Personal Digital Assistant). In another embodiment, two or more sensors are used to establish the position of the object at a first location (start location) and the position of the object at a second location (destination) and/or direction of movement of the object, rather than merely detect movement of the object past a location within the path of travel. In both embodiments, the sensors detect presence/absence of the object at predetermined locations and/or movement of the object (by sensing the indicator) when the task is being performed, and provide a signal to the monitoring component indicating that the task is being completed. The monitoring component then generates a response such as automatically removing the reminder to perform the task.

What is claimed is:

1. A method of authenticating a first device of a system including a plurality of devices, the method comprising:
   enabling said devices to communicate with one another;
   generating in said system a state of said first device, said state being a function of only states of said plurality of devices in said system such that said state of said first device is derived entirely from said plurality of devices in said system;
   requesting by said first device a service from a server and communicating said state of said first device to said server only after said state of said first device has been generated;
   simulating by said server said states of said plurality of devices to form a simulated state of said first device; and
   authenticating said first device when said simulated state of said first device matches said state of said first device.

2. The method of claim 1, wherein said function is based on at least a previous state of said plurality of devices.

3. The method of claim 1, wherein said function is based on at least a previous state of said first device.

4. The method of claim 1, wherein said function is based on at least information related to said first device.

5. The method of claim 1, wherein said function has a stochastic behavior.

6. The method of claim 1, wherein said function is based on at least a number of calls made or received by said first device.

7. The method of claim 6, wherein said number of said calls is weighted by time intervals between said calls.

8. The method of claim 1, wherein said function is based on at least a number of content of a buffer of said first device.

9. A system for authenticating a first device of a user system including a plurality of devices, the system comprising:
   means in each of said devices for enabling said devices to communicate with one another;
   means for generating in said user system a state of said first device, said state being a function of only states of said plurality of devices in said user system such that said state of said first device is derived entirely from said plurality of devices in said user system;
   means for requesting by said first device a service from a server and means for communicating said state of said first device to said server only after said state of said first device has been generated by said generating means;
   means for simulating by said server said states of said plurality of devices to form a simulated state of said first device; and
   means for authenticating said first device when said simulated state of said first device matches said state of said first device.

10. The system of claim 9, wherein said function is based on at least a previous state of said plurality of devices.

11. The system of claim 9, wherein said function is based on at least a previous state of said first device.

12. The system of claim 9, wherein said function is based on at least information related to said first device.

13. The system of claim 9, wherein said function has a stochastic behavior.

14. The system of claim 9, wherein said function is based on at least a number of calls made or received by said first device.

15. The system of claim 14, wherein said number of said call is weighted by time intervals between calls.

16. The system of claim 9, wherein said function is based on at least a number of content of a buffer of said first device.

17. A personal appliance which is part of a network of appliances, said personal appliance comprising:
   means for enabling said personal appliance to communicate with other appliances in said network;
   a state machine configured to generate a state of said personal appliance, said state being a function of only states of said appliances of said network such that said state of said personal appliance is derived entirely from said appliances of said network;
   means for communicating said state to a server which is configured to simulate said state of said personal appliance to form a simulated state of said personal appliance, said communicating means being arranged to communicate said state only after said state of said personal appliance has been generated by said state machine; and
   means for authenticating said personal appliance when said simulated state of said personal appliance matches said state of said personal appliance.

18. The personal appliance of claim 17, wherein said function is based on at least one of a previous state of said appliances of said network, a previous state of said personal appliance, and information related to said personal appliance.

* * * * *